United States Patent
Park et al.

(10) Patent No.: US 10,057,751 B2
(45) Date of Patent: Aug. 21, 2018

(54) ELECTRONIC DEVICE AND METHOD FOR UPDATING ACCESSORY INFORMATION

(71) Applicant: Samsung Electronics Co., Ltd., Gyeonggi-do (KR)

(72) Inventors: Ken-Hyung Park, Gyeonggi-do (KR); Hyun-Seok Shin, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 694 days.

(21) Appl. No.: 14/095,355

(22) Filed: Dec. 3, 2013

(65) Prior Publication Data

US 2015/0067098 A1    Mar. 5, 2015

(30) Foreign Application Priority Data

Sep. 2, 2013 (KR) .......... 10-2013-0104833

(51) Int. Cl.
*G06F 15/16* (2006.01)
*H04W 8/00* (2009.01)
*H04M 1/725* (2006.01)

(52) U.S. Cl.
CPC .......... *H04W 8/005* (2013.01); *H04M 1/7253* (2013.01); *H04M 2250/04* (2013.01)

(58) Field of Classification Search
None
See application file for complete search history.

(56) References Cited

U.S. PATENT DOCUMENTS

| | | | | |
|---|---|---|---|---|
| 7,697,963 | B1* | 4/2010 | Pomery | H02J 7/0044 455/426.1 |
| 8,819,114 | B2* | 8/2014 | Kumagai | G06Q 30/02 705/302 |
| 9,319,109 | B2* | 4/2016 | Jurgovan | H04B 5/0037 |
| 9,571,980 | B1* | 2/2017 | Apostolopoulos | H04W 4/025 |
| 2006/0047853 | A1* | 3/2006 | Igarashi | H04L 29/12028 709/245 |
| 2006/0239236 | A1* | 10/2006 | Otsuka | H04W 28/18 370/338 |
| 2006/0258289 | A1* | 11/2006 | Dua | G06F 17/30058 455/41.3 |
| 2006/0274363 | A1* | 12/2006 | Katano | H04L 29/12028 358/1.15 |
| 2008/0165024 | A1* | 7/2008 | Gretton | G01C 21/3655 340/4.31 |
| 2009/0111378 | A1* | 4/2009 | Sheynman | H04W 8/005 455/41.1 |

(Continued)

FOREIGN PATENT DOCUMENTS

KR    20120092366    8/2012

*Primary Examiner* — Shean Tokuta
(74) *Attorney, Agent, or Firm* — The Farrell Law Firm, P.C.

(57) ABSTRACT

An operating method of an electronic device and the electronic device are provided. The method includes detecting that a first accessory is located within a predetermined distance from the electronic device; determining whether address information stored in the first accessory corresponds to address information stored in the electronic device; and transmitting, to the first accessory, in response to a determination that the address information stored in the first accessory does not correspond to the address information stored in the electronic device, the address information stored in the electronic device.

10 Claims, 10 Drawing Sheets

(56) References Cited

U.S. PATENT DOCUMENTS

| | | | |
|---|---|---|---|
| 2009/0122339 A1* | 5/2009 | Nakamura | G06Q 10/10 358/1.15 |
| 2009/0135446 A1* | 5/2009 | Kawabuchi | G06F 8/65 358/1.15 |
| 2010/0062711 A1* | 3/2010 | Park | H04W 8/005 455/41.2 |
| 2011/0023087 A1* | 1/2011 | Aoki | H04L 63/08 726/3 |
| 2012/0117274 A1* | 5/2012 | Lydon | G06F 1/3209 710/5 |
| 2012/0219007 A1* | 8/2012 | Cho | H04L 12/2825 370/401 |
| 2012/0219008 A1* | 8/2012 | Lee | H04L 12/2834 370/401 |
| 2012/0229250 A1* | 9/2012 | Lim | G06F 21/44 340/5.8 |
| 2013/0016627 A1* | 1/2013 | Higashihara | H04L 43/10 370/254 |
| 2013/0036231 A1* | 2/2013 | Suumaki | H04W 12/04 709/228 |
| 2013/0215456 A1* | 8/2013 | Saitoh | H04N 1/00217 358/1.15 |
| 2013/0247117 A1* | 9/2013 | Yamada | G08C 17/02 725/93 |
| 2015/0011160 A1* | 1/2015 | Jurgovan | H04B 5/0031 455/41.1 |
| 2015/0032801 A1* | 1/2015 | Hart | H04W 4/12 709/203 |
| 2015/0067098 A1* | 3/2015 | Park | H04W 8/005 709/217 |
| 2015/0208245 A1* | 7/2015 | Robinton | H04L 9/3247 455/411 |
| 2016/0182283 A1* | 6/2016 | Mann | H04L 41/0813 709/220 |
| 2016/0269103 A1* | 9/2016 | Lu | H04W 4/00 |

* cited by examiner

ELECTRONIC DEVICE AND METHOD FOR UPDATING ACCESSORY INFORMATION

PRIORITY

This application claims priority under 35 U.S.C. § 119(a) to an application filed in the Korean Intellectual Property Office on Sep. 2, 2013 and assigned Serial No. 10-2013-0104833, the entire content of which is incorporated herein by reference.

BACKGROUND OF THE INVENTION

1. Field of the Invention

The present invention relates generally to a method and device for updating information, and more particularly, to a method and an electronic device for updating information of an accessory of the electronic device.

2. Description of the Related Art

An accessory capable of performing short-range communication with an electronic device separately stores address information of the accessory in an additional accessory due to the lack of mounting space. For example, a first accessory includes an additional storage space storing address information of a second accessory, and the second accessory performs the short-range communication with an electronic device.

SUMMARY OF THE INVENTION

An aspect of the present invention is to substantially address at least the above-described problems and/or disadvantages and to provide at least the advantages described below. Accordingly, an aspect of the present invention is to provide a device and method for improving a user's convenience by storing address information of a relocated accessory in another accessory through only an operation of tagging another accessory, where address information of an accessory in an electronic device.

Another aspect of the present invention is to provide a device and method for satisfying user's various demands by directly inputting address information of a newly relocated accessory into an electronic device through On The Air (OTA) communication and set an application when an accessory performing short-range communication with the electronic device is relocated.

According to an aspect of the present invention, an operating method of an electronic device is provided. The method includes detecting that a first accessory is located within a predetermined distance from the electronic device; determining whether address information stored in the first accessory corresponds to address information stored in the electronic device; and transmitting, to the first accessory, in response to a determination that the address information stored in the first accessory does not correspond to the address information stored in the electronic device, the address information stored in the electronic device.

According to another aspect of the present invention, an operating method of an accessory is provided. The method includes receiving a request for stored first address information from an electronic device located within a predetermined distance of the accessory; receiving second address information from the electronic device; and changing the stored first address information into the received second address information.

According to another aspect of the present invention, an electronic device is provided. The electronic device includes a processor configured to detect that a first accessory is located within a predetermined distance and determining whether address information stored in the first accessory corresponds to address information stored in the electronic device; and a communication module configured to transmit, to the first accessory, in response to a determination that the address information stored in the first accessory does not correspond to the address information stored in the electronic device, the address information stored in the electronic device to the first accessory.

According to another aspect of the present invention, an accessory is provided. The accessory includes a communication unit configured to receive a request for stored first address information from an electronic device located within a predetermined distance of the accessory and receive second address information from the electronic device; and a control unit configured to change the stored first address information into the received second address information.

BRIEF DESCRIPTION OF THE DRAWINGS

The above and other aspects, features and advantages of certain embodiments of the present invention will become more apparent from the following detailed description when taken in conjunction with the accompanying drawings, in which.

DETAILED DESCRIPTION OF EMBODIMENTS OF THE PRESENT INVENTION

Figure 1:
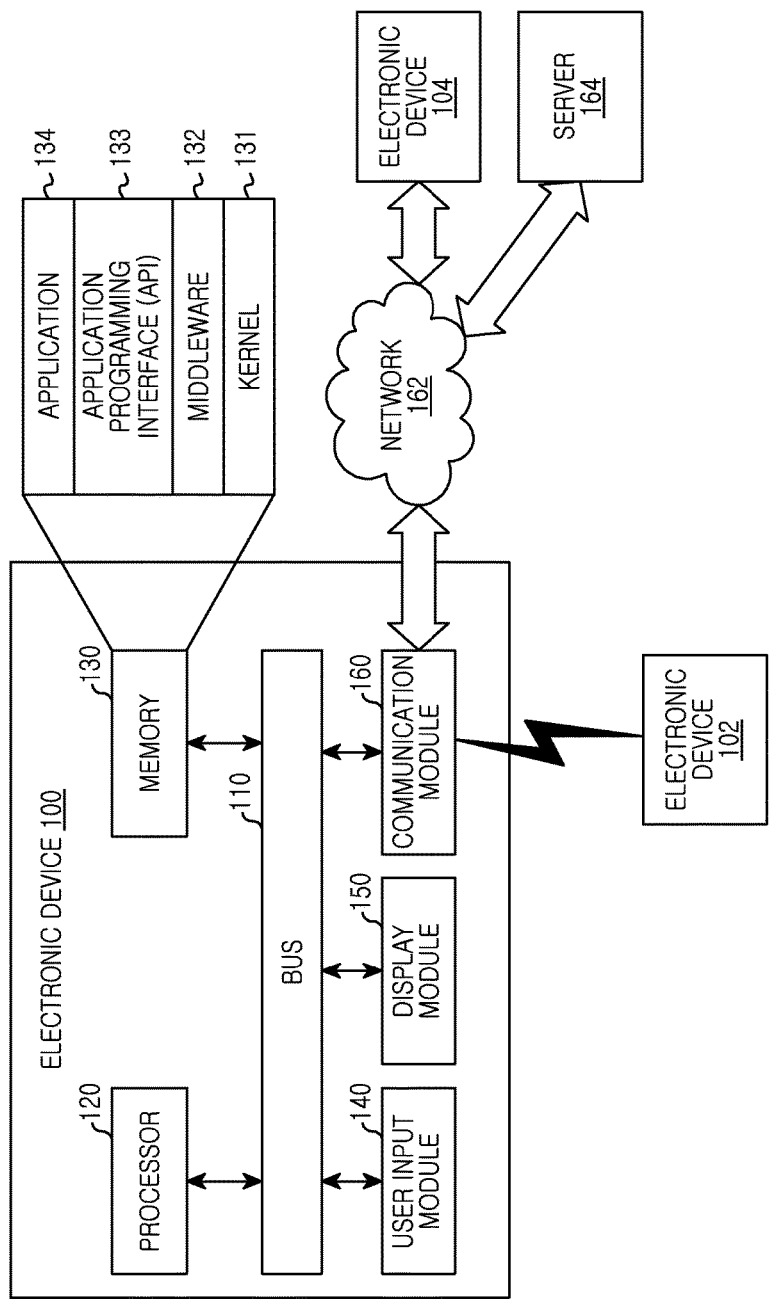
FIG. 1 is a block diagram illustrating an electronic device according to an embodiment of the present invention.

Hereinafter, embodiments of the present invention are described in detail with reference to the accompanying drawings. In the drawings, like reference numerals may refer to the same or similar elements. In the following description, certain well-known functions or constructions are not described in detail when such a description may obscure the subject matter of the invention.

An electronic device according to an embodiment of the present invention may be a device that includes a communication function. For example, the device may be any one of or a combination of various devices such as smartphones, tablet Personal Computers (PCs), mobile phones, video phones, e-book readers, desktop PCs, laptop personal PCs, netbook computers, Personal Digital Assistants (PDAs), Portable Multimedia Players (PMPs), Motion Picture Experts Group Audio Layer-3 (MP3) players, mobile medical equipment, electronic bracelets, electronic necklaces, electronic appcessories, cameras, wearable devices, electronic clocks, wristwatches, smart home appliances (e.g., refrigerators, air conditioners, vacuum cleaners, artificial intelligence robots, TeleVisions (TVs), Digital Video Disk (DVD) players, audio players, ovens, microwaves, washing machines, air purifiers, electronic picture frames, etc.), various medical devices (e.g., Magnetic Resonance Angiography (MRA) devices, Magnetic Resonance Imaging (MRI) devices, Computed Tomography (CT) devices, medical camcorders, ultrasound devices, etc.), navigation devices, Global Positioning System (GPS) receivers, Event Data Recorders (EDRs), Flight Data Recorders (FDRs), set-top boxes, a TV box (e.g., Samsung HomeSync™, Apple TV™, or Google TV™), electronic dictionaries, car infotainment devices, electronic equipment for ships (e.g., marine navigation devices, gyro compasses, etc.), avionics, security devices, electronic garments, electronic keys, camcorders, game consoles, Head-Mounted Displays (HMDs), flat panel display devices, electronic albums, furniture including communication functions, portions of buildings/structures, electronic boards, electronic signature receiving devices, or projectors. An electronic device according to an embodiment of the present invention is not limited to the above devices.

FIG. 1 is a block diagram illustrating an electronic device according to an embodiment of the present invention. Referring to FIG. 1, the electronic device 100 includes a bus 110, a processor 120, a memory 130, a user input module 140, a display module 150, and a communication module 160.

The bus 110 is a circuit that other connects components of the electronic device 100 to each other and delivers communications (e.g., a control message) between the components.

The processor 120 receives commands from other components (e.g., the memory 130, the user input module 140, the display module 150, and the communication module 160) via the bus 110, and decodes the received commands to perform calculations or data processing in response to the decoded commands.

The memory 130 stores commands and/or data received from the processor 120 or other components (e.g., the user input module 140, the display module 150, and the communication module 160) or generated by the processor 120 or other components. The memory 130 includes programming modules such as a kernel 131, a middleware 132, an Application Programming Interface (API) 133, and an application 134. Each of the above-listed programming modules may be configured with software, firmware, hardware, or a combination thereof.

The kernel 131 controls or manages system resources (e.g., the bus 110, the processor 120, or the memory 130) used to execute an operation or function implemented in the remaining other programming modules, such as the middleware 132, the API 133, or the application 134. Alternatively, the kernel 131 may provide an interface that accesses and controls or manages an individual component of the electronic device 100, through the middleware 132, the API 133, or the application 134.

The middleware 132 performs an intermediary role to exchange data as the API 133 or the application 134 performs communication with the kernel 131. Additionally, in relation to task requests received from a plurality of applications 134, the middleware 132 may also perform load balancing for task requests through a method of assigning a priority to a system resource of the electronic device 100 (e.g., the bus 110, the processor 120, or the memory 130), in order, for at least one of the plurality of applications 134.

The API 133 is an interface through which the application 134 controls a function provided from the kernel 131 or the middleware 132, and for example, may include at least one interface or function for file control, window control, image processing, or text control.

The user input module 140 receives commands or data from a user and then may delivers the received commands or data to the processor 120 or the memory 130 via the bus 110. The display module 150 displays images, videos, or data to a user.

The communication module 160 provides communication between the electronic device 100 and another electronic device 102. The communication module 160 supports a predetermined communication protocol (e.g., wireless fidelity (Wifi), Bluetooth (BT), and near field communication (NFC)) or a predetermined network communication 162 (e.g., Internet, local area network (LAN), wire area network (WAN), telecommunication network, cellular network, satellite network, and plain old telephone service (POTS)). Each of the electronic devices 102 and 104 may be a same type or different type of device than the electronic device 100.

Figure 2:
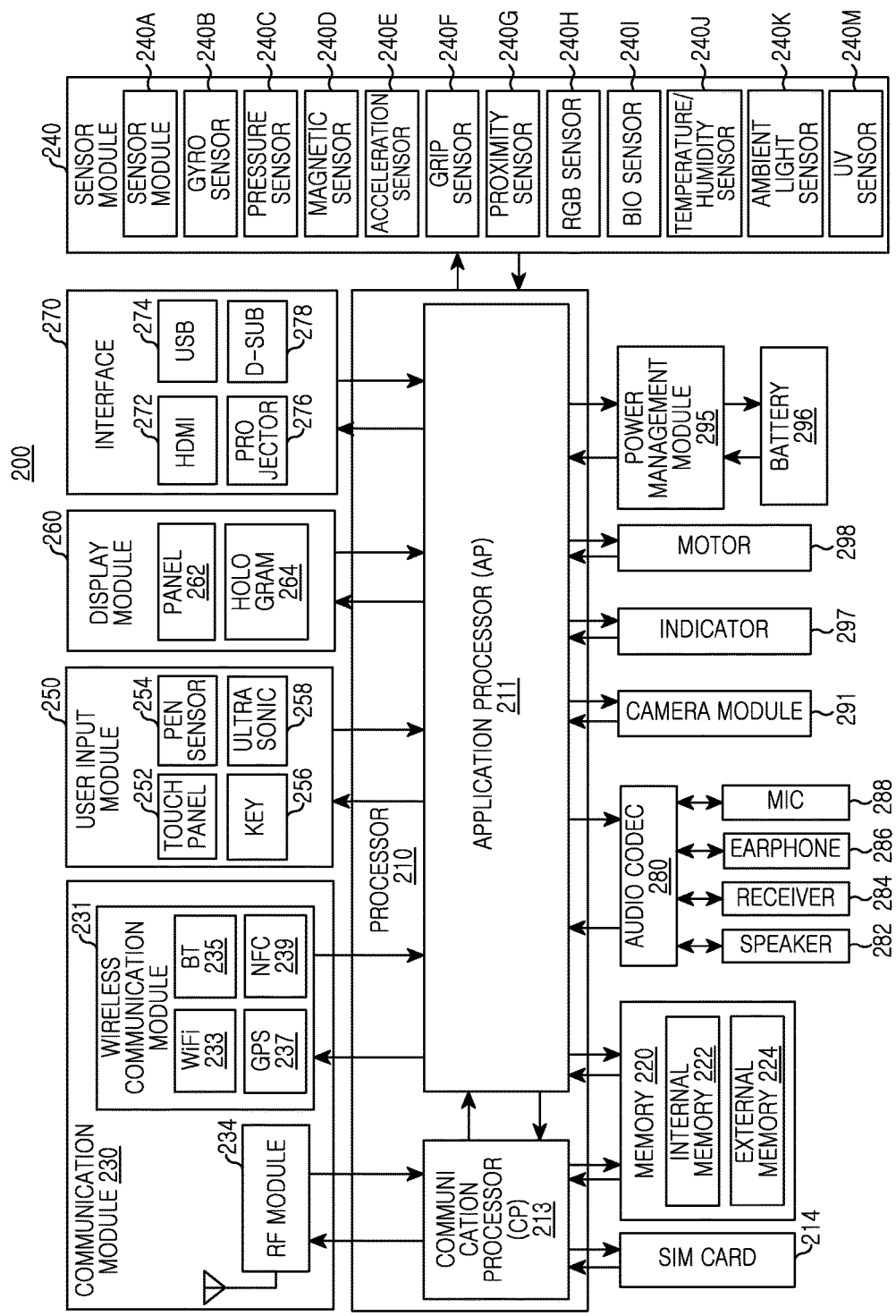
FIG. 2 is a block diagram illustrating hardware according to an embodiment of the present invention.

FIG. 2 is a block diagram illustrating hardware according to an embodiment of the present invention. The hardware 200 may be the electronic device 100 of FIG. 1. Referring to FIG. 2, the hardware 200 includes at least one processor 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (or the processor 120 of FIG. 1) may include at least one Application Processor (AP) 211 or at least one Communication Processor (CP) 213. The processor 210 may be the processor 120 of FIG. 1. Although the AP 211 and CP 213 are included in the processor 210 as shown in FIG. 2, they may be included different Integrated Circuit (IC) packages, respectively. According to an embodiment of the present invention, the AP 211 and CP 213 may be included in one IC package. The processor 210 detects when a first accessory is located within a predetermined distance and then determines whether address information in the first accessory matches address information stored in the processor 210. The processor 210 checks whether address information of a second accessory is stored in the processor 210, and changes the stored address information into address information of a third accessory. Additionally, the processor 210 executes an application for changing address information of an accessory, and checks whether the address information of the second accessory is changed into address information of the third accessory. Alternatively, the processor 210 may receive a command for changing address information stored in the first accessory into address information stored in the processor 210.

The AP 211 executes an Operating System (OS) or application program to control a plurality of hardware or software components connected to the AP 211, and performs various data processing of multimedia data and data calculations. The AP 211 may be implemented using System On a Chip (SoC). According to an embodiment of the present invention, the processor 210 may further include a Graphics Processing Unit (GPU) (not shown).

The CP 213 manages a data link and converts a communication protocol during communication between an electronic device including the hardware 200 (e.g., the electronic device 100) and other electronic devices. The CP 213 may be implemented using SoC. According to an embodiment of the present invention, the CP 213 may perform at least part of a multimedia control function. The CP 213 may perform the identification and verification of a terminal in a communication network by using a SIM card (e.g., the SIM card 214). Alternatively, the CP 213 may provide services to a user, such as voice calls, video calls, text messages, or packet data.

In addition to or as an alternative to the above-described operations of the CP 213, the CP 213 may control the data transmission of the communication module 230. Although components such as the CP 213, the power management module 295, or the memory 220 are separated from the AP 211 as shown in FIG. 2, the AP 211 may include at least part of the above components (e.g., a part of the CP 213).

According to an embodiment of the present invention, the AP 211 or the CP 213 may load commands or data received from nonvolatile memory or at least one component into volatile memory and process the loaded commands or data. Moreover, the AP 211 or the CP 213 may store data received from at least one component or generated by at least one component in nonvolatile memory.

The SIM card 214 is a card implementing a SIM, and may be inserted into a slot at a specific position of an electronic device. The SIM card 214 may include unique identification information such as an Integrated Circuit Card IDentifier (ICCID) or subscriber information such as an International Mobile Subscriber Identity (IMSI).

The memory 220 includes an internal memory 222 and an external memory 224. The memory 220 may be the memory 130 of FIG. 1. The internal memory 222 may include at least one of a volatile memory (e.g., Dynamic Random Access Memory (RAM) (DRAM), Static RAM (SRAM), Synchronous Dynamic RAM (SDRAM), etc.) or a non-volatile memory (e.g., One Time Programmable Read-Only Memory (ROM) (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.). According to an embodiment of the present invention, the internal memory 220 may include a Solid State Drive (SSD). The external memory 224 may further include Compact Flash (CF), Secure Digital (SD), Micro-SD, Mini-SD, eXtreme digital (xD), or memory stick-type memories.

The communication module 230 furthers include a wireless communication module 231 and an RF module 234. The communication module 230 may be the communication module 160 of FIG. 1. The wireless communication module 231 includes a WiFi module 233, a Bluetooth (BT) module 235, a GPS module 237, or a Near Field Communication (NFC) module 239. For example, the wireless communication module 231 may provide a wireless communication function by using a wireless frequency. Additionally or alternatively, the wireless communication module 231 may include a network interface (e.g., a Local Area Network (LAN) card) or a modem in order to connect the hardware 200 to a network (e.g., Internet, LAN, Wide Area Network (WAN), telecommunication network, cellular network, satellite network, Plain-Old Telephone Service (POTS), etc.). The communication module 230 may transmit internally stored address information to the first accessory when in response to determining that the internally stored address information is not identical to the address information of the first accessory. Additionally, in response to determining that a command is input, the communication module 230 may transmit the internally stored address information to the first accessory. Additionally, the communication module 230 may perform near field communication with the first accessory.

The RF module 234 performs data transmission (e.g., the transmission of an RF signal or a called electronic signal). Although not shown in FIG. 2, the RF module 234 may include a transceiver, a Power Amp Module (PAM), a frequency filter, or a Low Noise Amplifier (LNA). Additionally, the RF module 234 may further include a component (e.g., a conductor or a conducting wire) for transmitting/receiving electromagnetic waves through free space to perform wireless communication.

The sensor module 240 includes a gesture sensor 240A, a gyro sensor 240B, a pressure sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, an ambient light sensor 240K, and an Ultra Violet (UV) sensor 240M. The sensor module 240 may measure physical quantities or detect an operating status of an electronic device and convert the measured or detected information into electrical signals. Additionally or alternatively, the sensor module 240 may include an E-nose sensor (not shown), an ElectroMyoGraphy (EMG) sensor (not shown), an ElectroEncephaloGram (EEG) sensor (not shown), an ElectroCardioGram (ECG) sensor (not shown), or a fingerprint sensor. The sensor module 240 may further include a control circuit (not shown) for controlling at least one sensor therein.

The user input module 250 includes a touch panel 252, a digital pen sensor 254, a key 256, or an ultrasonic input device 258. The user input module 250 may be the user input module 140 of FIG. 1. The touch panel 252 may recognize touch input through at least one of capacitive, resistive, infrared, and ultrasonic methods. The touch panel 252 may further include a controller (not shown). When using the capacitive method of recognizing touch, direct touch or proximity recognition is possible. The touch panel 252 may further include a tactile layer that provides tactile reaction to a user.

The digital pen sensor 254 may be implemented through the same or similar method to that of receiving a user's touch input or an additional sheet for recognition. The ultrasonic input device 258 is a device for checking data by detecting sound waves through a microphone (e.g., the microphone 288) in a terminal, which comes from a pen generating ultrasonic signals According to an embodiment of the present invention, the hardware 200 uses the communication module 230 to receive user input from an external device (e.g., a network, a computer, or a server) connected to the communication module 230.

The display module 260 includes a panel 262 and a hologram display 264. The display module 260 may be the display module 150 of FIG. 1. The panel 262 may include, for example, a Liquid-Crystal Display (LCD) or an Active-Matrix Organic Light-Emitting Diode (AM-OLED) (not shown). The panel 262 may be implemented to be flexible, transparent, or wearable. The panel 262 may be integrated with the touch panel 252 as one module. The hologram 264 may display a three-dimensional (3-D) image using light interference. According to an embodiment of the present invention, the display module 260 may include a control circuit for controlling the panel 262 or the hologram 264. The display module 260 may receive a command for changing address information of the second accessory into address information of the third accessory.

The interface 270 includes a High-Definition Multimedia Interface (HDMI) 272, a Universal Serial Bus (USB) 274, a projector 276, or a D-subminiature (D-sub) 278. Additionally/alternatively, the interface 270 may include Secure Digital (SD)/Multi-Media Card (MMC) (not shown) or an InfraRed Data Association (IrDA) interface (not shown).

The audio codec 280 converts voice to electrical signals and vice-versa. The audio codec 280 may convert voice information input or output through a speaker 282, a receiver 284, an earphone 286, or the microphone 288.

The camera module 291 is a device for capturing images and videos and may include at least one image sensor (e.g., a front lens or a rear lens), Image Signal Processor (ISP) (not shown), or flash Light Emitting Diode (LED) (not shown).

The power management module 295 manages power of the hardware 200. Although not shown in FIG. 2, the power management module 295 may include a Power Management Integrated Circuit (PMIC), a charger Integrated Circuit (IC), or a battery fuel gauge.

The PMIC may be built in an IC or an SoC semiconductor. A charging method of the hardware 200 may include both a wired method and a wireless method. The charger IC charges a battery and prevents overvoltage or overcurrent from flowing from a charger. According to an embodiment of the present invention, the charger IC may include a wired charting method or a wireless charging method. The wireless charging method may include a magnetic resonance method, a magnetic induction method, or an electromagnetic method, and may further include an additional circuit for wireless charging, for example, a circuit such as a coil loop, a resonant circuit, or a rectifier.

A battery gauge (not shown) may measure the remaining of the battery 296 and the voltage, current, or temperature of the battery 296 during charging. The battery 296 generates electricity to supply power and may be a rechargeable battery.

The indicator 297 displays a specific state of the hardware 200 or part thereof (e.g., a booting state, a message state, or a charging state). The motor 298 converts electrical signals into mechanical vibrations. The MicroController Unit (MCU) 299 may control the sensor module 240.

Although not shown in FIG. 2, the hardware 200 may include a processing device (e.g., a GPU) used for mobile TV. The processing device for mobile TV may process media data according to a standard such as Digital Multimedia Broadcasting (DMB), Digital Video Broadcasting (DVB) or media flow.

The names of the components in hardware according to embodiments of the present invention may vary according to a type of an electronic device. The hardware may be configured including at least one of the above components. Some components may be omitted or additional other components may be further included. Furthermore, some of components in hardware may be combined into a single entity, such that corresponding functions of the components before the combination may be identically performed by the single entity.

Figure 3:
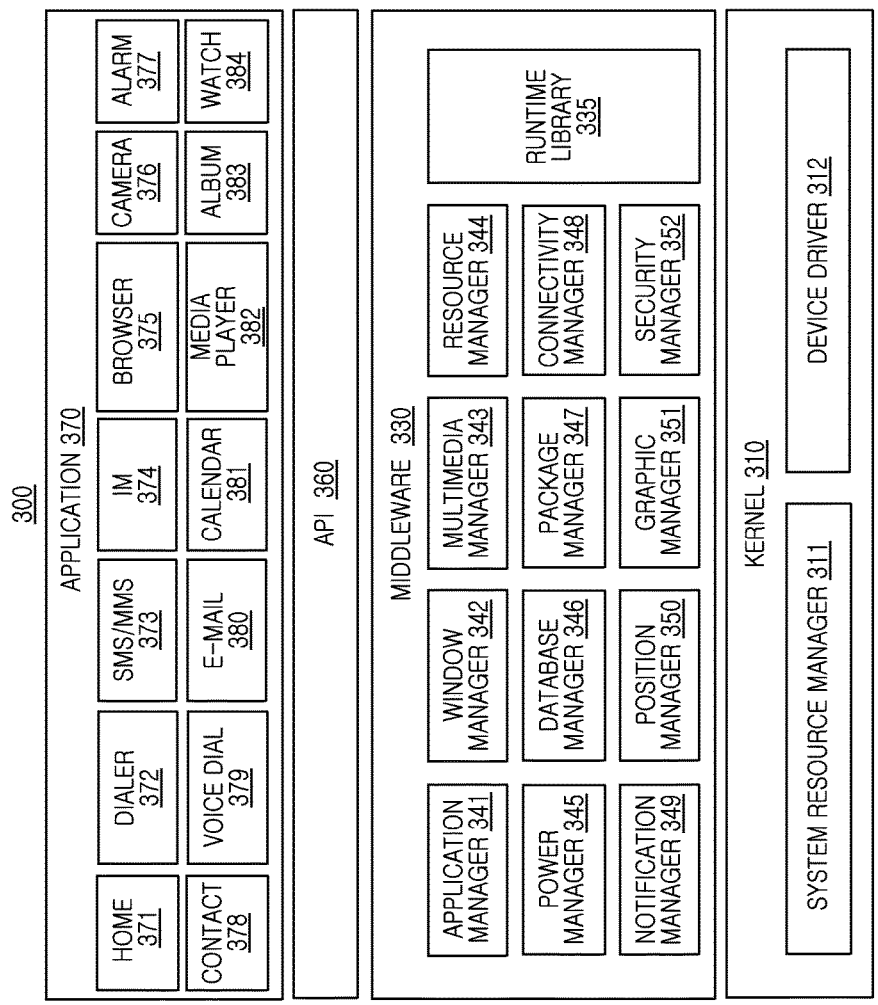
FIG. 3 is a block diagram illustrating a programming module according to an embodiment of the present invention.

FIG. 3 is a block diagram illustrating a programming module according to an embodiment of the present invention. The programming module 300 may be included (e.g., stored) in the electronic device 100 (e.g., the memory 130) of FIG. 1. At least part of the programming module 300 may be configured using software, firmware, hardware, or a combination thereof. The programming module 300 may include an Operating System (OS) controlling a resource relating to an electronic device (e.g., the electronic device 100) implemented by hardware (e.g., the hardware 200) or various applications (e.g., the applications 370) running on an OS. For example, OS may include Android, IOS, Windows, Symbian, Tizen, or Bada. Referring to FIG. 3, the programming module 300 includes middleware 330, an Application Programming Interface (API) 360, and an application 370.

The kernel 310 (or the kernel 131 of FIG. 1) includes a system resource manager 311 and a device driver 312. The system resource manager 311 includes a process management unit 313, a memory management unit 315, and a file system management unit 317. The system resource manager 311 performs control, allocation, or recovery of a system resource. The device driver 312 includes a display driver 314, a camera driver 316, a Bluetooth driver 318, a sharing memory driver 320, a USB driver 322, a keypad driver 324, a WiFi driver 326, and an audio driver 328. According to an embodiment of the present invention, the device driver 312 may include an Inter-Process Communication (IPC) driver (not shown).

The middleware 330 may include a plurality of pre-implemented modules to provide a function commonly required by the application 370. Additionally, the middleware 330 provides a function through the API 360, so that the application 370 efficiently uses limited system resources in an electronic device. For example, as shown in FIG. 3, the middleware 330 (or the middleware 132 of FIG. 1) includes a runtime library 335, an application manager 341, a window manager 342, a multimedia manager 343, a resource manager 344, a power manager 345), a database manager 346, a package manager 347, a connectivity manager 348, a notification manager 349, a location manager 350, a graphic manager 351, and a security manager 352.

The runtime library 335 may include a library module (not shown) that a compiler uses to add a new function through programming language while the application 370 is executed. According to an embodiment of the present invention, the runtime library 335 may perform a function for input/output, memory management, or arithmetic function.

The application manager 341 manages a life cycle of at least one application among the applications 370. The window manager 342 manages a Graphical User Interface (GUI) resource used for a screen. The multimedia manager 343 determines a format necessary for playback of various media files and performs encoding or decoding on a media file by using codec fit for a corresponding format. The resource manager 344 manages a resource such as source code, memory, or storage space of at least one application among the applications 370.

The power manager 345 manages a battery or power and provides power information necessary for an operation in operation with Basic Input/Output System (BIOS). The database manager 346 generates, searches, or modifies a database used for at least one application among the applications 370. The package manager 347 manages installation or update of applications distributed in the form of a package file.

The connectivity manager 348 manages wireless connections, such as WiFi or Bluetooth connections. The notification manager 349 displays or notifies a user of an event such as arriving message, appointment, and proximity alert, without interfering with a user's operation of a device that includes the programming module 300. The location manager 350 manages position information of an electronic device. The graphic manager 351 manages graphic effects to be provided to a user or a user interface relating thereto. The security manager 352 provides a general security function used for system security or user authentication. According to an embodiment of the present invention, when an electronic device (e.g., the electronic device 100) has a call function, the middleware 330 may further include a telephony manager (not shown) for managing a voice or video call function of the electronic device.

The middleware 330 generates a new middleware module through combinations of various functions of the internal component modules. The middleware 330 provides specialized modules according to types of OS so as to provide differentiating functions. Additionally, the middleware 330 deletes some existing components or adds new components dynamically. Accordingly, some of the above-listed components may be omitted, or other components may be further included, or components having a different name and performing a similar function may be provided as replacement, all in accordance with embodiments of the present invention.

The API 360 (or the API 133 of FIG. 1) is a set of API programming functions and may be provided with a different configuration according to OS. For example, in the case of Android or iOS, one API set may be provided for each platform, and in the case of Tizen, at least two API sets may be provided.

The application 370 (or application 134 of FIG. 1) may include preloaded applications and third party applications.

At least part of the programming module 300 may be implemented using commands stored in computer-readable storage media. At least one processor (e.g., the processor 210 of FIG. 2) performs a function corresponding to a command during command execution. The computer-readable storage media may include the memory 260. At least part of the programming module 300 may be implemented (e.g., executed) by the processor 210. At least part of the programming module 300 may include modules, program routines, sets of instructions, or processes so as to perform at least one function.

The names of components in a programming module (e.g., the programming module 300) may vary according to a type of OS. Additionally, a programming module may include at least one of the above components, exclude some of the above components, or include additional other components, all in accordance with embodiments of the present invention.

Figure 4:
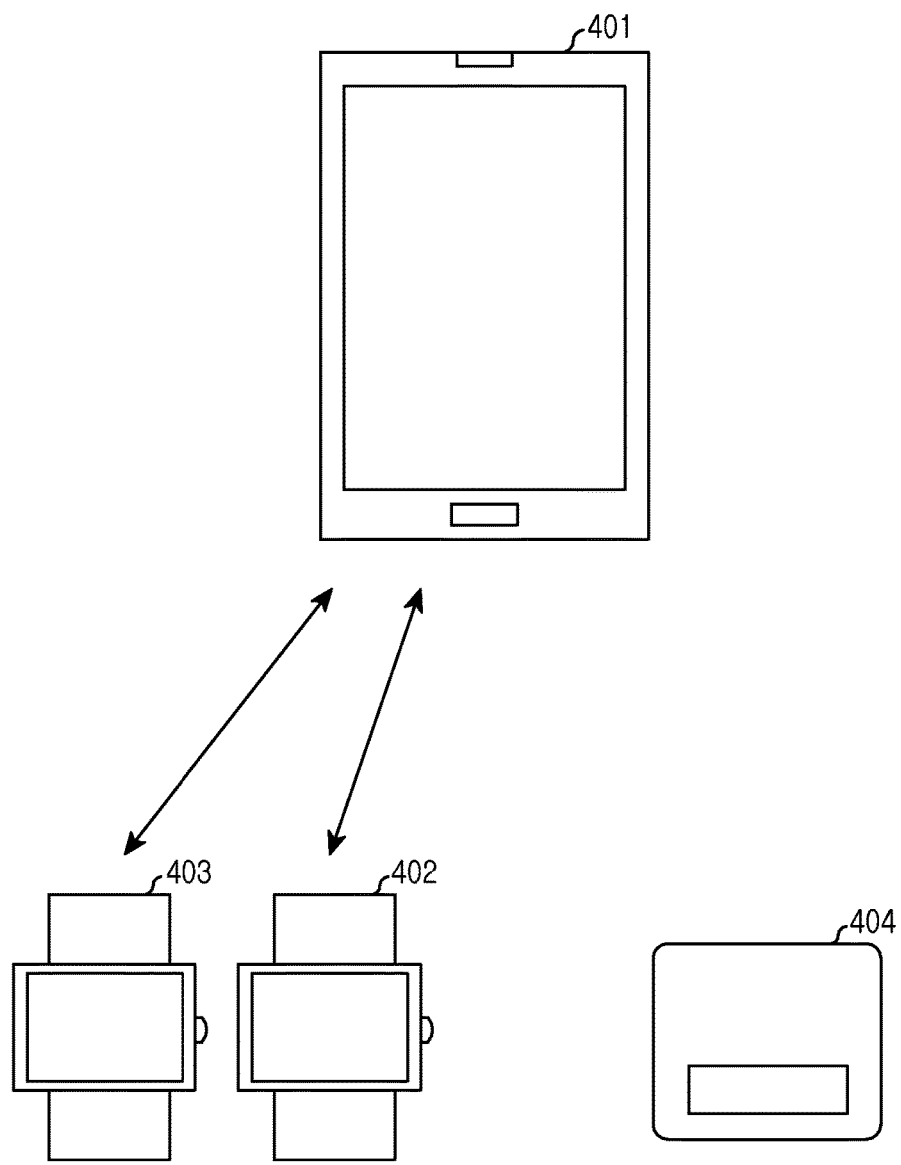
FIG. 4 is a diagram illustrating input of address information of a second accessory to an electronic device when a first accessory changes into the second accessory according to an embodiment of the present invention.

FIG. 4 is a diagram illustrating input of address information of a second accessory to an electronic device when a first accessory changes into the second accessory according to an embodiment of the present invention. As shown in FIG. 4, address information of a first accessory 402 and a second accessory 403 are stored in a third accessory 404, due to the lack of internal mounting space within the first and second accessories 402 and 403.

Here, the first accessory 402 and the second accessory 403 may be accessories transmitting/receiving mutual information through short-range communication with the electronic device 401. For example, the first accessory 402 and the second accessory 403 may be wearable electronic devices, such as smart watches. Additionally, the third accessory 404 is an additional accessory for storing address information of the first accessory 402 and the second accessory 403. For example, the third accessory 404 may be a charging docking station used in a home or office.

Hereinafter, a process performed with respect to the electronic device 401 and the first accessory 402, in which the first accessory 402 is replaced with the second accessory 403 while they are linked for mutual short-range communication, is described in more detail as follows.

While the first accessory 402 performing short-range communication is relocated with the second accessory 403, the electronic device 401 may store the address information of the first accessory 402. Accordingly, in order for the electronic device 401 to tag the third accessory 404, it is necessary to first input the address information of the second accessory 403 in the electronic device 401. Herein, "tagging" refers to an electronic device performing near field communication with another electronic device.

Since the electronic device 401 stores the address information of the first accessory 402, the electronic device 401 may directly receive the address information of the newly-relocated second accessory 403. In order for the electronic device 401 to tag the third accessory 404, the address information of the second accessory 403 is input into the electronic device 401.

The electronic device 401 receives the address information of the newly-relocated second accessory 403 through wireless connection, such as a WiFi, Bluetooth, or wired connection, and then changes the existing address information of the first accessory 402 into the address information of the second accessory 403.

The electronic device 401 may also change the address information of the first accessory 402 into the address information of the second accessory 403 by using an application installed in the electronic device 401.

Through the above-mentioned method, the electronic device 401 stores the address information of the second accessory therein and then enters a process for performing tagging with the third accessory 404.

Figure 5:
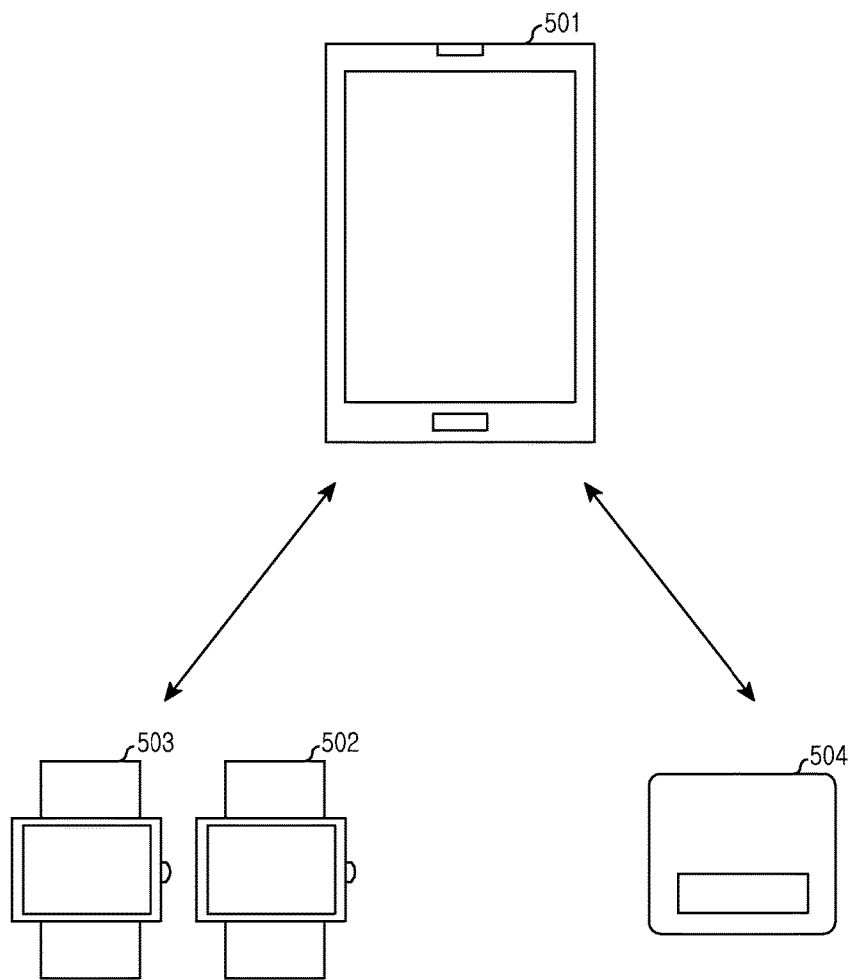
FIG. 5 is a diagram illustrating transmission of address information of an accessory performing short-range communication to another accessory in an electronic device according to an embodiment of the present invention.

FIG. 5 is a diagram illustrating transmission of address information of an accessory performing short-range communication to another accessory in an electronic device according to an embodiment of the present invention. First, as shown in FIG. 5, when the first accessory 502 performing short-range communication with the electronic device 501 changes into the second accessory 503 and the address information of the changed second accessory 503 is stored in the electronic device 501 will be described.

As mentioned above, although the address information of the second accessory 503 is stored in the electronic device 501, the address information of the first accessory 502 (i.e., information before the replacement), is still stored in the third accessory 504. Accordingly, even when the electronic device 501 is close to a predetermined range set with the third accessory 504, the electronic device 501 and the third accessory 504 may not tag each other. That is, when a user replaces an accessory, the address information of the third accessory 504 is not generally relocated together with the replacement of the accessory. Therefore, the electronic device 501 and the third accessory 504 may not tag each other.

When replacing the first accessory 502 with the second accessory 503, due to failure of the first accessory 502, a user carries the first accessory 502 either alone or with the electronic device 501 to a service center in general. Since the third accessory 504 is configured in the form of a charging docking station, it is typically installed at a home or office.

Accordingly, a method of easily replacing the address information of an old accessory stored in the third accessory 504 with the address information of a newly-relocated accessory is required. Hereinafter, a process of transmitting the address information of the second accessory 503 stored in the electronic device 501 to the third accessory 504 according to an embodiment of the present invention is described in more detail as follows.

First, the electronic device 501 detects whether the third accessory 504 is located within a predetermined distance of the electronic device 501 for tagging.

If the distance between the electronic device 501 and the third accessory 504 is within the predetermined distance for tagging, the electronic device 501 determines whether the address information stored in the third accessory 504 is identical to the address information stored in the electronic device 501. Here, since the address information of the newly-relocated second accessory 503 is stored in the electronic device 501, but the address information of the first accessory 502 (i.e., information before the replacement) is stored in the third accessory 504, the electronic device 501 determines that the address information of the first accessory 502 and the second accessory 503 are not identical to each other.

Hereinafter, the electronic device 501 transmits the address information of the second accessory 503 stored in the electronic device 501 to the third accessory 504. More specifically, in response to determining that the electronic device 501 receives a command for changing the address information of the first accessory 502 stored in the third accessory 504 into the address information of the second accessory 503, the electronic device 501 transmits the address information of the second accessory 503 to the third accessory 504. More specifically, before transmitting the address information of the second accessory 503 to the third accessory 504, the electronic device 501 may request a user for a verification of whether to store the address information of a relocated accessory in the third accessory 504.

If the electronic device 501 receives a command for changing the address information of the first accessory 502 stored in the third accessory 504 into the address information of the second accessory 503, the electronic device 501 transmits the address information of the second accessory 503 to the third accessory 504. Then, the electronic performs short-range communication with the third accessory 504 through an operation of tagging the third accessory 504. Since the address information of the relocated second accessory 503 is stored in the third accessory 504, a user of the electronic device 501 is able to easily perform short-range communication with the third accessory 504.

Figure 6:
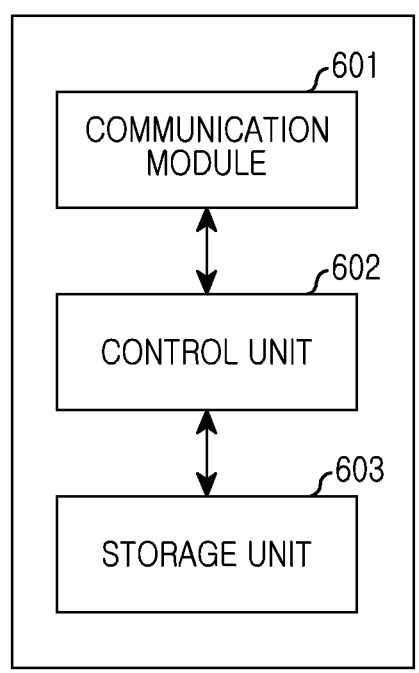
FIG. 6 is a block diagram illustrating a configuration of an accessory according to an embodiment of the present invention.

FIG. 6 is a block diagram illustrating a configuration of an accessory according to an embodiment of the present invention. First, as shown in FIG. 6, the accessory includes a communication module 601, a control unit 602, and a storage unit 603. Here, the accessory may additionally store the address information of another accessory capable of performing short-range communication with an electronic device. An example of such short-range communication is described as follows.

First, the communication module 601 processes signals transmitted/received through an antenna in order for voice and data communication. For example, the communication module 601 may receive a request for stored first address information from an electronic device (not shown) located within a predetermined distance and may receive second address information from an electronic device (not shown). Here, the first address information and the second address information are address information of other accessories capable of performing short-range communication with an electronic device. Additionally, the communication module 601 performs a tagging operation with an electronic device located within a predetermined distance, and transmits the second address information to the electronic device.

The control unit 602 controls overall operations of an accessory. For example, the control unit 602 changes the stored first address information into the received second address information.

The storage unit 603 may include a program storage unit (not shown) for storing a program for controlling an operation of an accessory and a data storage unit for storing data generated during program execution.

In the above block configuration, the control unit 602 controls overall operations of an accessory. The above-described components are shown as separately configured in order to distinctively describe each function. Therefore, when a product is actually implemented, the control unit 602 may be configured to process all the functions of an accessory or only some of the functions of an accessory, in accordance with embodiments of the present invention.

Figure 7:
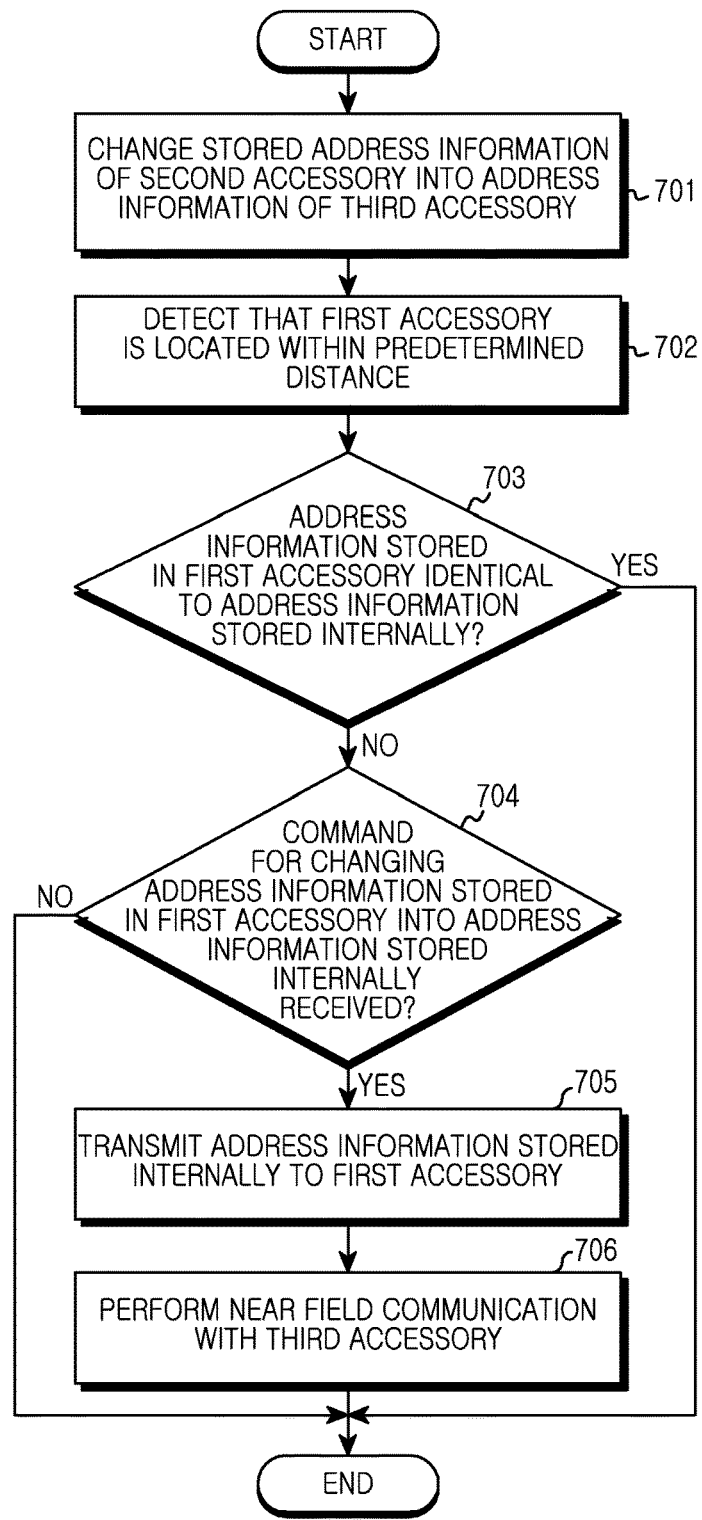
FIG. 7 is a flowchart illustrating a method of an electronic device according to an embodiment of the present invention.

FIG. 7 is a flowchart illustrating a method of an electronic device according to an embodiment of the present invention. Hereinafter, a first accessory is an accessory where address information of another accessory is additionally stored, a second accessory is an accessory before an accessory change, and a third accessory is an accessory after the change (i.e., replacing the second accessory with the third accessory). The device and accessory described herein with respect to FIG. 7 may be the same as those described with reference to FIG. 4, for example. First, as shown in FIG. 7, the electronic device changes the address information of the second accessory stored in the electronic device into the address information of the third accessory. For example, the electronic device may receive the address information of the newly-relocated second accessory from a user. Additionally, the electronic device receives the address information of the newly-relocated second accessory through wireless connection such as WiFi and Bluetooth or wired connection, and then changes the existing address information of the first accessory into the address information of the second accessory. The electronic device may also change the address information of the first accessory into the address information of the second accessory by using an application installed in the electronic device.

In step 702, the electronic device detects whether the first accessory is located within a predetermined distance. More specifically, the electronic device detects that a distance between the electronic device and the first accessory is within a predetermined distance for tagging the first accessory.

After detecting the first accessory within the predetermined distance, the electronic device determines whether the address information stored in the first accessory is identical to the address information stored in the electronic device, in step 703. More specifically, the electronic device determines whether the address information of a newly-changed accessory is stored in the first accessory.

If the address information stored in the first accessory is not identical to the address information stored in the electronic device, the electronic device determines whether a command for changing the address information stored in the first accessory into the address information stored in the electronic device is received, in step 704. For example, before transmitting the address information of the third accessory to the first accessory, the electronic device may request a user for a verification of whether to store the address information of a relocated accessory in the first accessory.

If the electronic device receives a command for changing the address information stored in the first accessory into the address information stored in the electronic device in step 704, the electronic device transmits the address information stored in the electronic device to the first accessory in step 705. More specifically, the electronic device transmits the changed address information to the first accessory so as to change the address information stored in the first accessory (i.e., information before the change) into the address information of an accessory (i.e., information after the change).

Then, the electronic device performs short-range communication with the first accessory, in step 706. For example, the electronic device may perform a tagging operation with the first accessory.

If the address information stored in the first accessory is identical to the address information stored in the electronic device in step 703, the electronic device terminates the method immediately.

Moreover, if the electronic device does not receive a command for changing the address information stored in the first accessory into the address information stored in the electronic device in step 704, the electronic device terminates the method immediately.

Figure 8:
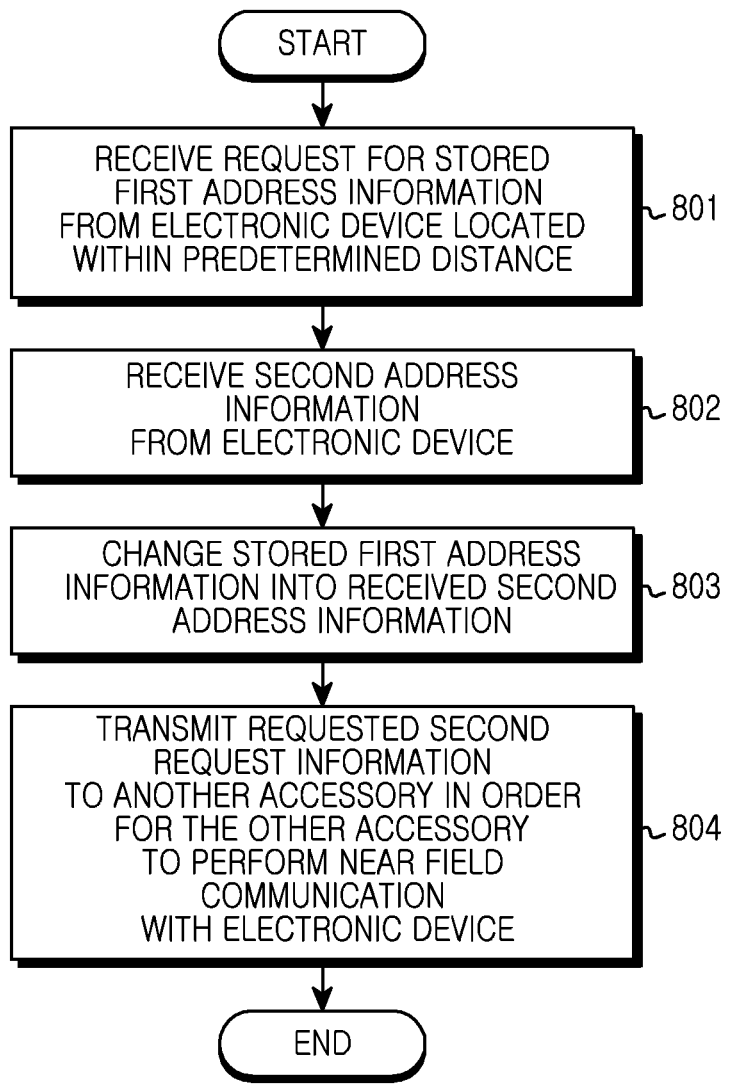
FIG. 8 is a flowchart illustrating a method of an accessory according to an embodiment of the present invention.

FIG. 8 is a flowchart illustrating a method of an accessory according to an embodiment of the present invention. Hereinafter, a first accessory is an accessory where the address information of another accessory is additionally stored. In step 801, the accessory may request first address information from an electronic device located within a predetermined distance. More specifically, the accessory receives a request for the address information of another accessory stored in the accessory. That is, a first address is the address information of another accessory stored in the accessory, before the accessory change.

In step 802, the accessory receives second address information from the electronic device. More specifically, the accessory receives the second address information from the electronic device in order to change the first address information stored in the accessory. The second address is the new address information of the changed accessory.

In step 803, the accessory changes the first address information stored therein into the received second address information. More specifically, the accessory receives the second address information (i.e., the address information of the newly changed accessory) from the electronic device, and easily changes the stored first address information into the second address information.

In step 804, the accessory performs a tagging operation with the electronic device located within a predetermined distance. Since the address information stored in the accessory is identical to the second address information stored in the electronic device, the accessory performs the tagging operation with the electronic device located within the predetermined distance set for short-range communication.

Figure 9:
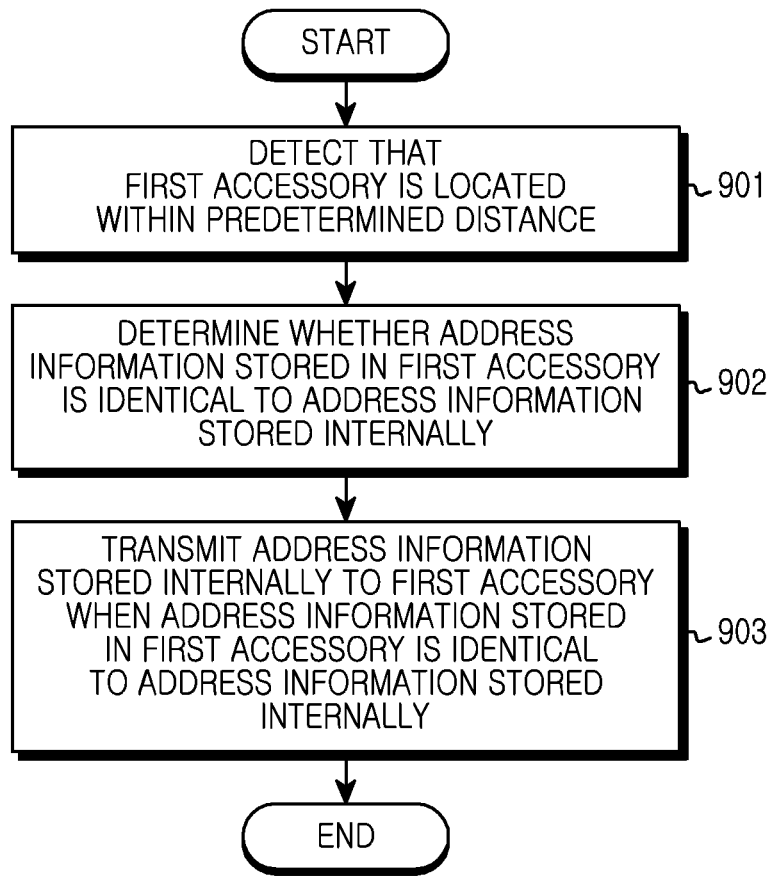
FIG. 9 is a flowchart illustrating a method of an electronic device according to an embodiment of the present invention.

FIG. 9 is a flowchart illustrating a method of an electronic device according to an embodiment of the present invention. Hereinafter, a first accessory is an accessory where address information of another accessory is additionally stored, a second accessory is an accessory before an accessory change, and a third accessory is an accessory after the accessory change (i.e., after the second accessory is replaced with the third accessory). Referring to FIG. 9, in step 901, the electronic device detects that the first accessory is located within a predetermined distance. More specifically, the electronic device detects that a distance between the electronic device and the first accessory is within a predetermined distance for tagging the first accessory.

In step 902, the electronic device determines whether the address information stored in the first accessory is identical to the address information stored in the electronic device. More specifically, the electronic device determines whether the address information of a newly-changed accessory is stored in the first accessory.

In response to a determination that the address information stored in the first accessory is not identical to the address information stored in the electronic device, the electronic device transmits the address information stored in the electronic device to the first accessory, in step 903. More specifically, when the address information of a changed accessory is not stored in the first accessory, the electronic device transmits the address information of a newly-changed accessory to the first accessory, so as to perform a tagging operation with the first accessory.

Figure 10:
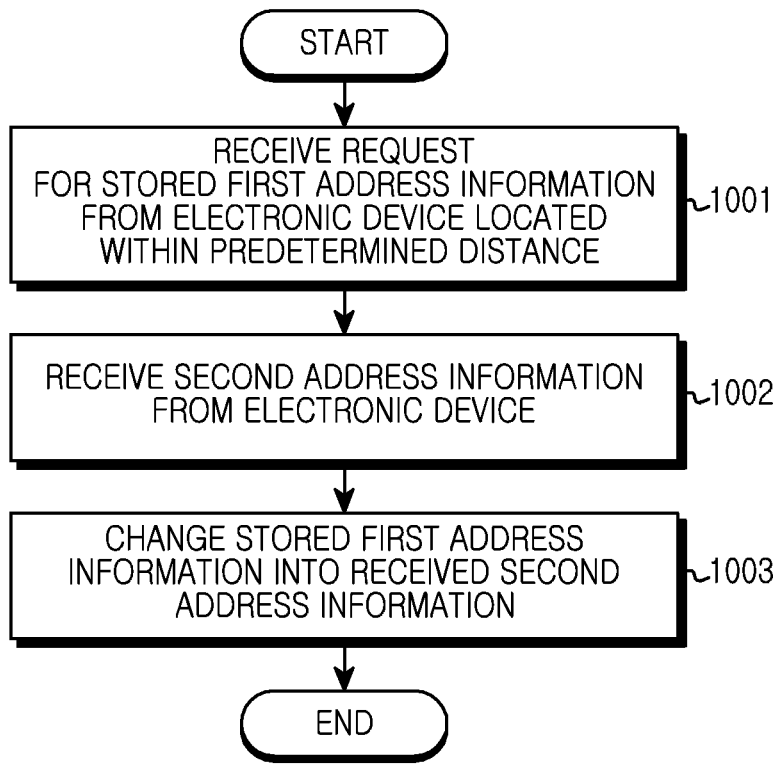
FIG. 10 is a flowchart illustrating an accessory method according to an embodiment of the present invention.

FIG. 10 is a flowchart illustrating an accessory method according to an embodiment of the present invention. Hereinafter, a first accessory is an accessory where the address information of another accessory is additionally stored. In step 1001, the accessory receives a request for stored first address information from an electronic device located within a predetermined distance. More specifically, the accessory receives a request for the address information of another accessory stored in the accessory. The first address is the address information of another accessory before the accessory change stored in the accessory.

In step 1002, the accessory receives second address information from the electronic device. More specifically, the accessory receives the second address information from the electronic device in order to change the first address information stored in the accessory. The second address is the new address information of the changed accessory.

In step 1003, the accessory changes the first address information stored therein into the received second address information. More specifically, the accessory receives the second address information, i.e., the address information of the newly changed accessory, from the electronic device, and easily changes the stored first address information into the second address information. Since the address information stored in the accessory is identical to the second address information stored in the electronic device, the accessory performs a tagging operation with the electronic device located within a predetermined distance for short-range communication.

While the invention has been shown and described with reference to certain embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims and their equivalents.

What is claimed is:

1. A method of an electronic device, the method comprising:
   establishing, by a communication module of the electronic device, a first link between the electronic device and a third accessory;
   storing, by a memory of the electronic device, third address information, which is associated with short-range communication between the electronic device and the third accessory, based on the first link;
   establishing, by the communication module, a second link between the electronic device and a second accessory;
   receiving, from the second accessory by a processor of the electronic device, second address information, which is associated with short-range communication between the electronic device and the second accessory, based on the second link;
receiving, by the processor, a first user input for replacing the third address information with the second address information;
replacing, by the processor, the third address information stored in the memory with the second address information, in response to the first user input;
detecting, by the processor, whether a first accessory is located within a predetermined distance from the electronic device;
receiving, by the communication module, information from the first accessory, in response to a request for transmission of the information that is stored in the first accessory, when the first accessory is located within the predetermined distance;
determining, by the processor, whether the stored second address information is identical to the received information from the first accessory; and
transmitting, by the communication module, to the first accessory, when the stored second address information is not identical to the received information, the stored second address information and a command for changing the information stored in the first accessory to the second address information.

2. The method of claim 1, further comprising:
receiving a second user input for inputting the second address information manually; and
storing the second address information based on the second user input.

3. The method of claim 1, further comprising:
executing an application for changing address information of an accessory according to detection of the second accessory; and
changing, by the application, the third address information to second address information.

4. The method of claim 1, wherein transmitting the stored second address information and the command comprises:
receiving, from a user, a third user input for changing the information stored in the first accessory to the second address information; and
transmitting the stored second address information stored and the command to the first accessory, in response to the third user input.

5. The method of claim 1, wherein the first accessory is a charging docking station.

6. An electronic device, comprising:
a memory;
a communication module; and
a processor configured to:
establish a first link between the electronic device and a third accessory,
store, in the memory, third address information, which is associated with short-range communication between the electronic device and the third accessory, based on the first link,
establish, by the communication module, a second link between the electronic device and a second accessory,
receive, from the second accessory, second address information, which is associated with short-range communication between the electronic device and the second accessory, based on the second link,
receive, a first user input for replacing the third address information stored in the memory with the second address information,
replace the third address information stored in the memory with the second address information, in response to the first user input,
detect whether a first accessory is located within a predetermined distance from the electronic device, and
receive information from the first accessory, in response to a request for transmission of the information that is stored in the first accessory, when the first accessory is located within the predetermined distance,
determine, whether the stored second address information is identical to the received information from the first accessory, and
transmit, to the first accessory, when the stored second address information is not identical to the received information, the stored second address information and a command to change the information stored in the first accessory to the second address information.

7. The electronic device of claim 6, wherein the processor is further configured to:
receive a second user input for inputting the second address information manually, and
store the second address information based on the second user input.

8. The electronic device of claim 6, wherein the processor is further configured to execute an application for changing address information of an accessory according to detection of the second accessory, and
wherein the application changes the third address information to second address information.

9. The electronic device of claim 6, wherein the processor is further configured to:
receive, from a user, a third user input for changing the information stored in the first accessory to the second address information, and
transmit the stored second address information and the command to the first accessory, in response to the third user input.

10. The electronic device of claim 6, wherein the first accessory is a charging docking station.

* * * * *